United States Patent [19]
Seal et al.

[11] Patent Number: 5,583,804
[45] Date of Patent: Dec. 10, 1996

[54] DATA PROCESSING USING MULTIPLY-ACCUMULATE INSTRUCTIONS

[75] Inventors: David J. Seal; Guy Larri, both of Cambridge; David V. Jaggar, Cherry Hinton, all of United Kingdom

[73] Assignee: Advanced Risc Machines Limited, Cambridge, United Kingdom

[21] Appl. No.: 379,014

[22] Filed: Jan. 27, 1995

[30] Foreign Application Priority Data

Jul. 14, 1994 [GB] United Kingdom ............... 9414272

[51] Int. Cl.⁶ ............................................. G06F 7/38
[52] U.S. Cl. .................... 364/736; 364/754; 364/757; 364/745
[58] Field of Search ............................. 364/736, 754, 364/757, 745

[56] References Cited

U.S. PATENT DOCUMENTS 5,204,828  4/1993  Kohn ................... 364/736
5,241,492  8/1993  Girardeau, Jr. ........ 364/736

FOREIGN PATENT DOCUMENTS

WO86/02181A1  4/1986  WIPO ............... G06F 7/48

*Primary Examiner*—Roy N. Envall, Jr.
*Assistant Examiner*—Monica Lewis
*Attorney, Agent, or Firm*—Albert C. Smith

[57] ABSTRACT

A data processing system is described utilizes a multiplier-accumulator 108 that performs both a first class of multiply-accumulate instructions and a second class of multiply-accumulate instructions. The first class of multiply-accumulate instructions are of the form N*N+N→N and the second class of multiply-accumulate instructions are of the form N*N+2N→2N. The second class of multiply-accumulate instructions provide a greater precision of arithmetic in a single instruction and avoid the use of excessive instruction set space by being constrained that the result is written back into the two registers from which the 2N-bit accumulate value was taken. The multiplier-accumulator also provides N*N→N and N*N→2N multiplication operations.

10 Claims, 7 Drawing Sheets

DATA PROCESSING USING MULTIPLY-ACCUMULATE INSTRUCTIONS

BACKGROUND OF THE INVENTION

1. Field of the Invention

This invention relates to the field of data processing. More particularly, this invention relates to data processing of the type in which multiply-accumulate instructions are used to specify that a first operand should be multiplied by a second operand and then a third operand added to yield the result. The operands are stored within data processing registers from a bank of data processing registers within the system.

2. Description of the Prior Art

It is known to provide data processing systems having a multiply-accumulate instruction within their instruction set. An example of such a system is the ARM6 integrated circuit microprocessor produced by Advanced RISC Machines Limited. The ARM6 microprocessor incorporates a multiply-accumulate instruction For multiplying a first 32-bit operand by a second 32-bit operand and then adding a third 32-bit operand. The registers containing the three input operands to this instruction together with the register in which the results should be written are specified by fields within the multiplier-accumulate instruction. As an example, the two 32-bit operands to be multiplied together could be in Register 5 and Register 6, with the accumulate value in Register 10 and the result being written into Register 2.

It is desirable that a data processing system should be able to specify the data processing operation required by a user with the minimum number of instructions. This results in smaller program sizes and generally faster and more efficient operation. However, a problem in providing such more sophisticated data processing operations in single instructions is the amount of information that needs to be specified by the instruction. More particularly, if an instruction utilizes multiple data processing registers as resources to execute that instruction, then the identity of those registers must be specified in the instruction. This can use an unacceptable amount of the bit space within the instruction. A further problem with such sophisticated instructions utilizing a relatively large number of the data processing registers within a system is that efficient compilation of a program becomes more difficult as the finite data processing register resources must be shared between the many different operands in use.

SUMMARY OF THE INVENTION

It is an object of the invention to address the abovementioned problems.

Viewed from one aspect this invention provides apparatus for processing data, said apparatus comprising:

(i) a register bank of N-bit data processing registers; and (ii) a multiplier-accumulator coupled to said register bank for performing multiply-accumulate operations upon operands held in said N-bit data processing registers; wherein (iii) said multiplier-accumulator is responsive to a first class of multiply-accumulate instructions to multiply an N-bit operand held in a first data processing register by an N-bit operand held in a second data processing register and add an N-bit operand held in a third data processing register to yield an N-bit result that is stored in a fourth data processing register, said first, second, third and fourth data processing registers being independently specified as fields within said first class of multiply-accumulate instructions; and (iv) said multiplier-accumulator is responsive to a second class of multiply-accumulate instructions to multiply an N-bit operand held in a first data processing register by an N-bit operand held in a second data processing register and add a 2N-bit operand held in a third and a fourth data processing registers to yield a 2N-bit result that is stored in said third and said fourth data processing registers, said first, second, third and fourth data processing registers being independently specified as fields within said second class of multiply-accumulate instructions.

The invention recognizes that in the case of multiply-accumulate instructions, which place a high demand upon the register resources available, it is strongly advantageous to provide more than one class of such multiply-accumulate instructions having different precisions and demands upon system resources. The first class of multiply-accumulate instructions that perform an (N*N)+N operation yields an N-bit result which is of comparatively lower precision than the second class of multiply-accumulate instructions that performs an (N*N)+2N operation yielding a 2N-bit result. The second class of multiply-accumulate operation avoids excessive pressure upon the bit space within the instruction by requiring that the result is written into two of the registers that contained the input variables. A programmer using such an apparatus with these multiply-accumulate instructions is able to choose that instruction which best suits the particular circumstances concerned; the need to be free as to specifying both input and output registers can be balanced against a desire to achieve a 2N-bit result in one operation. The provision of the two instructions yields a synergy that enables associated programs to be smaller and execute more quickly.

Multiplier-accumulators may be structured in a number of different ways. One possibility is that the multiplier-accumulator first completes the multiplication operation and then conducts the addition operation as a separate later action. However, this invention is particularly suited for applications in which said multiplier-accumulator performs multiplication and addition as a single combined operation.

Multiplication and addition as a single combined operation has the advantage of increased speed and enables a reduced data path width, but imposes the requirement that all of the input operands are simultaneously available.

The multiplier-accumulator can be made to perform other arithmetic operations by bypassing certain of its functional units. In this way, in preferred embodiments of the invention said multiplier-accumulator is responsive to a first class of multiply instructions to multiply an N-bit operand held in a first data processing register by an N-bit operand held in a second data processing register to yield an N-bit result that is stored in a third data processing register, said first, second and third data processing registers being independently specified as fields within said first class of multiply instructions; and said multiplier-accumulator is responsive to a second class of multiply instructions to multiply an N-bit operand held in a first data processing register by an N-bit operand held in a second data processing register to yield a 2N-bit result that is stored in a third and a fourth data processing register, said first, second, third and fourth data processing registers being independently specified as fields within said second class of multiply instructions.

The provision of a first and second class of multiply instructions having different precisions is complementary to the multiply-accumulate instructions having different precisions.

In order that the instruction set density should not be unduly reduced by the provision of such relatively complex multiply-accumulate instructions, it is desirable that said fields specifying said data processing registers occupy no more than half of the instruction bits within said first class of multiply-accumulate instructions and instructions within said second class of multiply-accumulate instructions.

When the space for the field specifying data processing registers is reduced, the maximum number of different registers that may be specified is also reduced. In this context, the invention is particularly suited to embodiments in which said bank of data processing registers comprises no more than sixteen data processing registers for simultaneous use, i.e. only four bits are required within the instruction to specify a register.

It will be appreciated that while it would be possible to implement the invention with discrete circuit components, the invention is particularly suited to an embodiment as part of an integrated circuit microprocessor.

The coding efficiency of the system is improved when instructions within said first class of multiply-accumulate instructions and instructions within said second class of multiply-accumulate instructions include a field comprising conditional execution codes and comprising means responsive to said conditional execution codes for controlling whether an instruction should be skipped without execution.

While the provision of conditional execution codes increases coding efficiency, it places significant demands upon the bit space available within the instructions and consequently the space available for specifying which registers should be used by the instruction. For this reason, the invention is particularly helpful in that context.

While the multiplier-accumulator could be implemented as microcode within a more general purpose microcomputer, the performance benefits given by the invention are particularly useful in systems in which said multiplier-accumulator is a dedicated hardware multiplier-accumulator.

While the invention could be used in systems based upon many different bit length architectures, the invention is particularly suited to systems in which N is equal to 32. In such systems, bit space within the instructions is at a premium and the additional precision of a 64-bit result is only sometimes necessary. In this way, the invention is particularly useful.

Viewed from another aspect the invention provides a method of processing data using an apparatus having a register bank of N-bit data processing registers and a multiplier-accumulator coupled to said register bank for performing multiply-accumulate operations upon operands held in said N-bit data processing registers, said method comprising the steps of:

(i) in response to a first class of multiply-accumulate instructions, multiplying an N-bit operand held in a first data processing register by an N-bit operand held in a second data processing register and adding an N-bit operand held in a third data processing register to yield an N-bit result that is stored in a fourth data processing register, said first, second, third and fourth data processing registers being independently specified as fields within said first class of multiply-accumulate instructions; and (ii) in response to a second class of multiply-accumulate instructions multiplying an N-bit operand held in a first data processing register by an N-bit operand held in a second data processing register and adding a 2N-bit operand held in a third and a fourth data processing registers to yield a 2N-bit result that is stored in said third and said fourth data processing registers, said first, second, third and fourth data processing registers being independently specified as fields within said second class of multiply-accumulate instructions.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
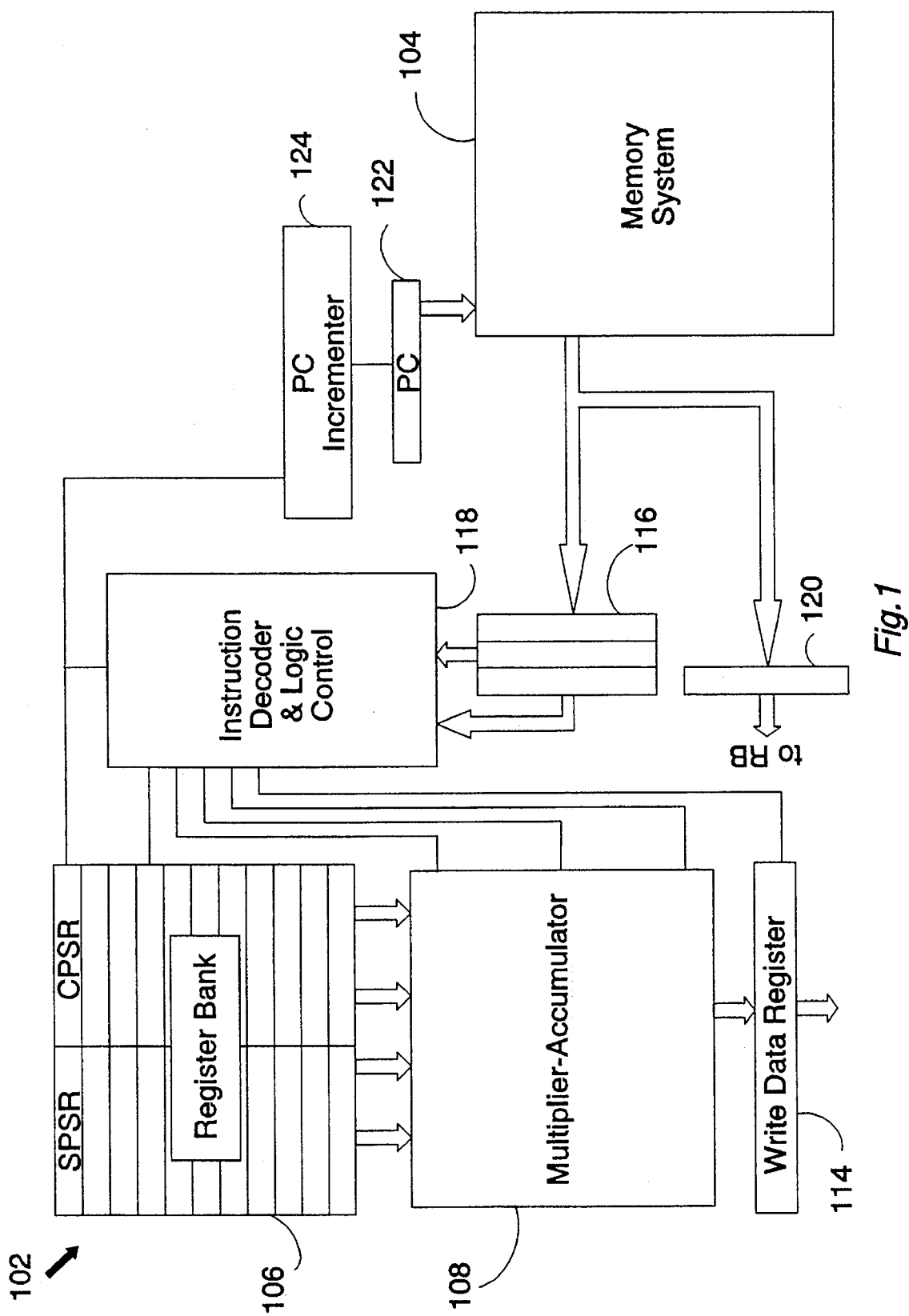
FIG. 1 illustrates the functional units within an integrated circuit microprocessor.

FIG. 1 illustrates a data processing system (that is formed as part of an integrated circuit) comprising a processor core 102 coupled to a memory system 104.

The processor core 102 includes a register bank 106, a multiplier-accumulator 108 and a write data register 114. The processor core 102 also includes an instruction pipeline 116, an instruction decoder 118 and a read data register 120 that link the rest of the elements of the processor core 102 to the memory system 104. A program counter register 122, which is part of the processor core 102, is shown addressing the memory system 104. A program counter incrementer 124 serves to increment the program counter value within the program counter register 122 as each instruction is executed and a new instruction must be fetched for the instruction pipeline 116.

The processor core 102 incorporates N-bit data pathways (in this case 32-bit data pathways) between the various functional units. In operation, instructions within the instruction pipeline 116 are decoded by the instruction decoder 118 which produces various core control signals that are passed to the different functional elements within the processor core 102. In response to these core control signals, the different portions of the processor core 102 conduct 32-bit processing operations, e.g. 32-bit multiplication, 32-bit addition, multiply-accumulate operations of differing precisions, . . . .

The register bank 106 includes a current program status register 126 and a saved program status register 128. The current program status register 126 holds various condition and status flags for the processor core 102. These flags may include processing mode flags (e.g. system mode, user mode, memory abort mode etc.) as well as flags indicating the occurrence of zero results in arithmetic operations, carries and the like. These flags control the conditional execution of program instructions in dependence upon the parameters specified by the condition codes of the first four bits of each instruction. The saved program status register 128 (which may be one of a banked plurality of such saved program status registers) is used to temporarily store the contents of the current program status register 126 if an exception occurs that triggers a processing mode switch. In this way, exception handling can be made faster and more efficient.

Once the required program instruction words have been recovered from the memory system 104, they are decoded by the instruction decoder 118 and initiate 32-bit processing within the processor core 102.

Figure 2:
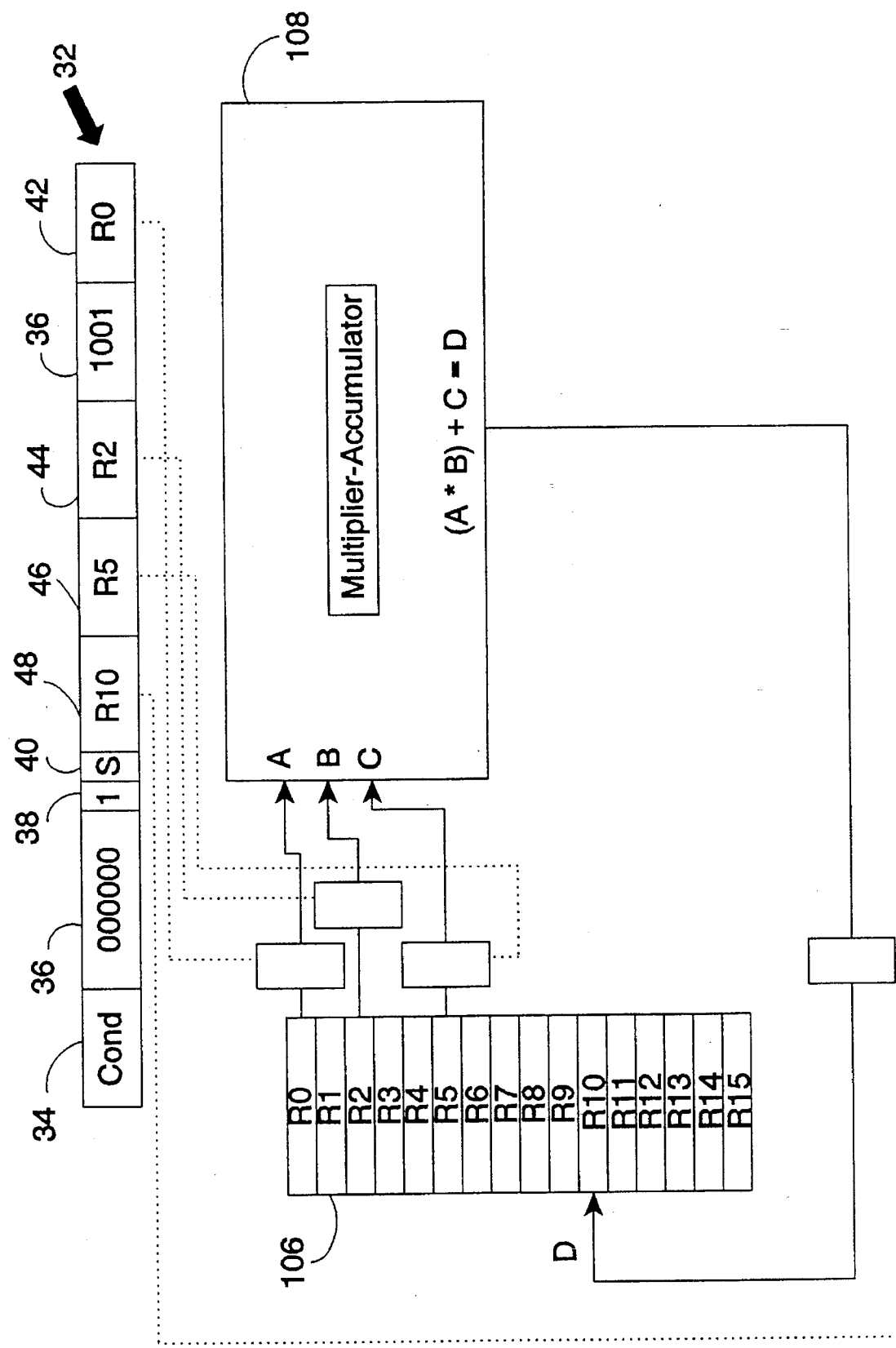
FIGS. 2, 3, 4, and 5 are each schematic diagrams that illustrate the use of register resources and arithmetic operations undertaken in response to various program instruction words.

FIG. 2 schematically illustrates the use of resources in response to a 32*32+32→32 multiply-accumulate operation. The program instruction word 32 contains a condition code field 34 storing the parameters specifying the conditions under which that instruction should either be executed or skipped by the instruction decoder 118 that is illustrated in FIG. 1. The bit fields 36 identify the instruction word 32 as a low precision multiply-accumulate operation that will yield a 32-bit result. An accumulate flag 38 has a value of 1 indicating that an accumulate operation is to be formed for this instruction word 32. If this accumulate flag 38 were a 0 then no accumulate operation would be performed. A set condition code flag 40 specifies whether the current program status register flags are to be updated upon execution of the instruction word 32.

The instruction word 32 includes four register specifying fields 42, 44, 46 and 48 respectively. If the operation being performed is denoted as (A*B)+C=D, then register field 42 specifies the register (in this case R0) containing the variable A, register field 44 specifies the register (in this case R2) containing the variable B, register field 46 specifies the register (in this case R5) containing the variable C and register field 48 specifies the register (in this case R10) into which the result D is to be written. The values stored within the register fields 42, 44, 46 and 48 serve to control the reading and writing of registers within the register bank 106. In the case of this 32*32+32→32 instruction, all three input variable registers and the output variable register may be independently specified.

The instruction word 32 illustrated in FIG. 2 can be considered to belong to the first class of multiply-accumulate instructions that operate on N-bit input variables and produce an N-bit output. This instruction utilizes four independently specified registers. The register fields within the instruction occupy 16 bits (each register field being four bits long so as to specify one of the 16 registers within the register bank 106).

Figure 3:
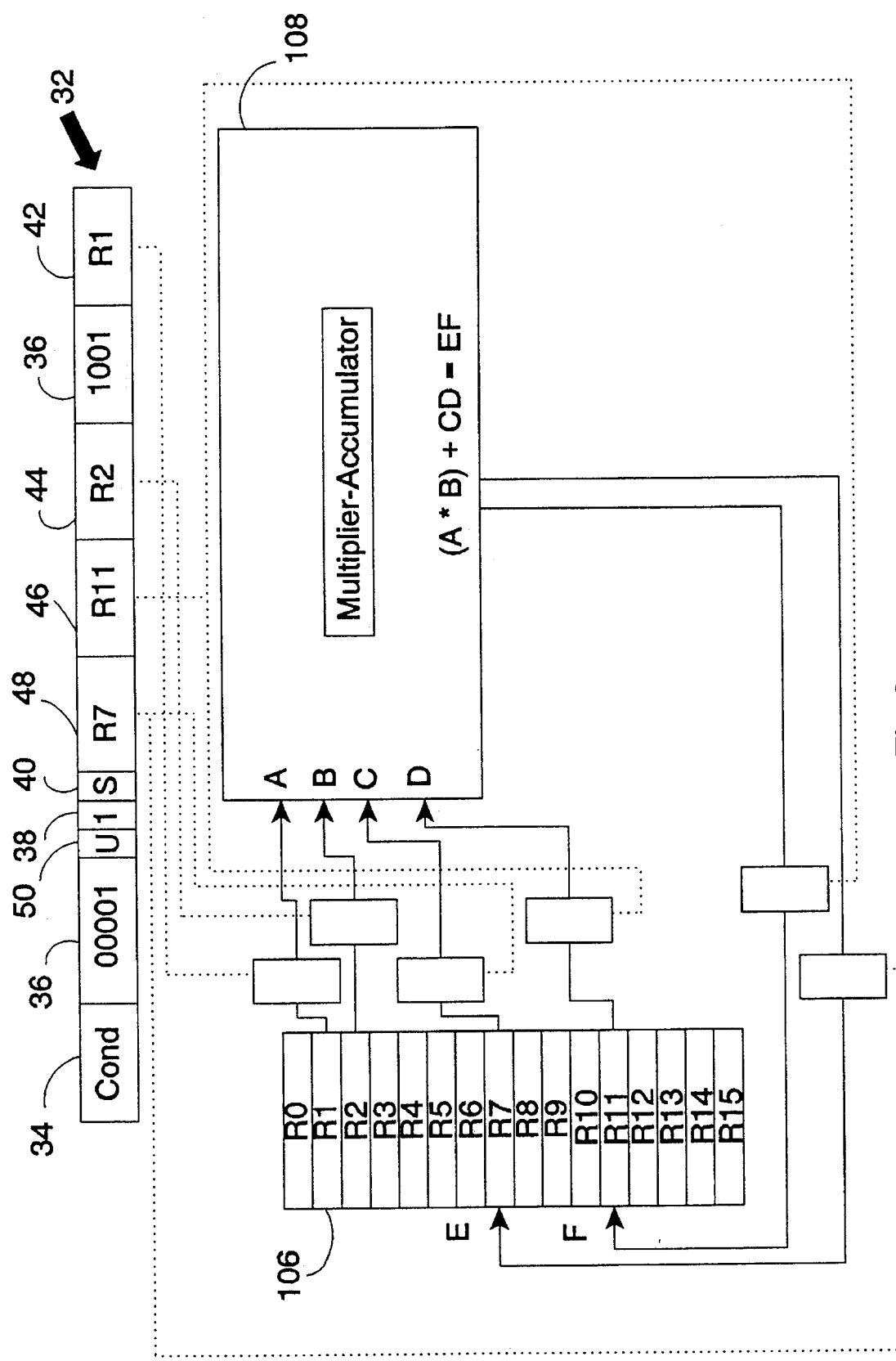

FIG. 3 illustrates an instruction word 32 of the second class of multiply-accumulate instructions in which a 64-bit result is produced by the multiply-accumulate operation (i.e. 32×32+64→64). In this case, the accumulate value is CD and is stored within the registers specified by the register fields 48 and 46 respectively. The most significant 32 bits C of the accumulate value CD are stored within register R7 and the least significant 32 bits D of the accumulate value CD are stored within the register R11.

Since sufficient space within the instruction word 32 is only present to specify four registers, the result of the operation EF is written into the same registers (R7, R11) from which the accumulate value CD was taken. This saves instruction set space and yet allows increased precision 64-bit arithmetic operations to be performed with a single instruction word 32.

The processor core 102 that is illustrated in FIG. 1 performs two cycles of initialization, reading two registers one each cycle. This is a result of having only two read ports to the register bank 106.

The instruction word 32 of FIG. 3 contains an additional flag 50 that indicates whether the arithmetic is to be signed or unsigned.

Figure 4:
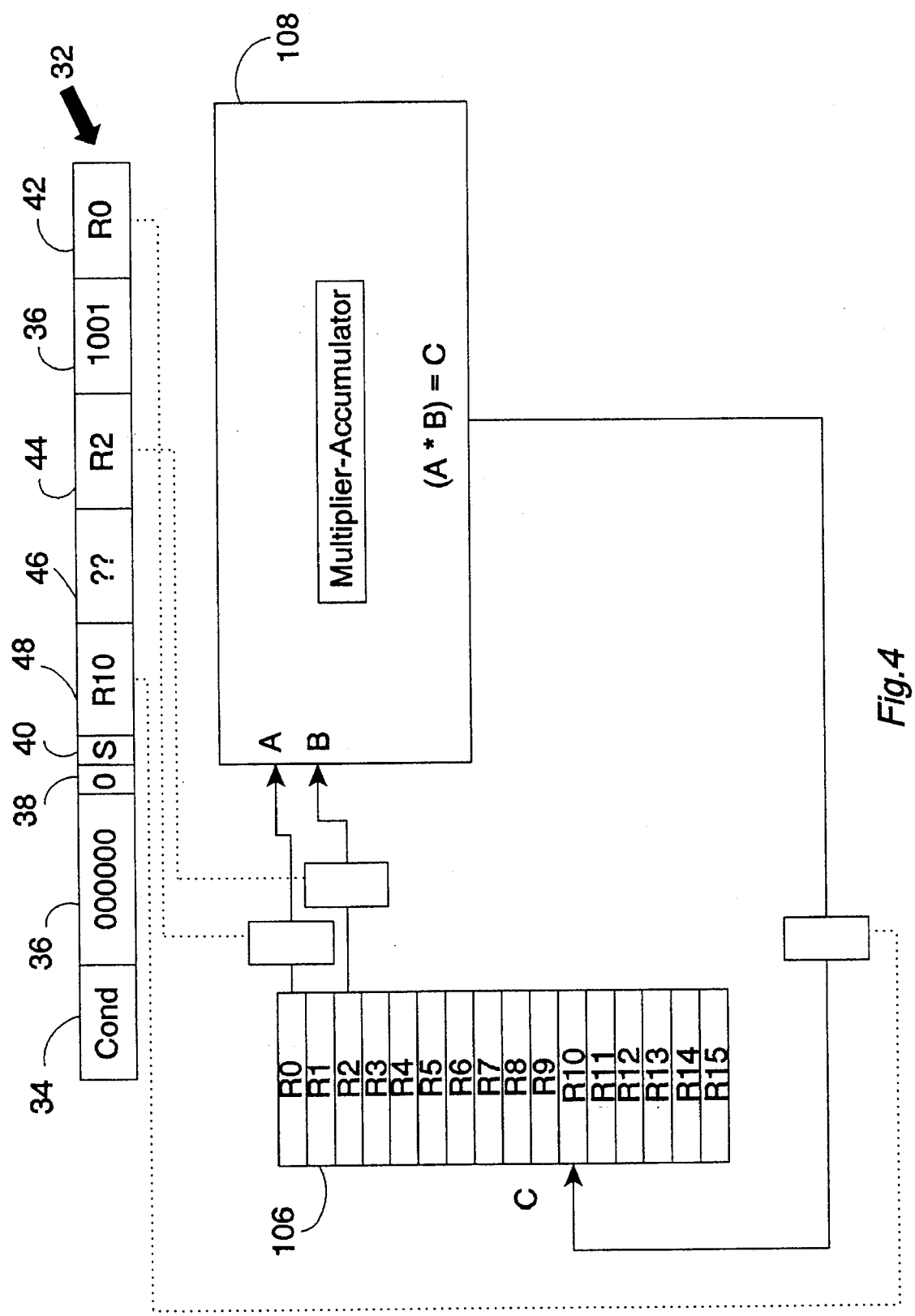

FIG. 4 illustrates a first class of multiply instructions performed by the multiplier-accumulator 108. These instructions yield a 32-bit result (i.e 32×32→32). In this case, the register field 46 is not utilized and can contain any value.

Figure 5:
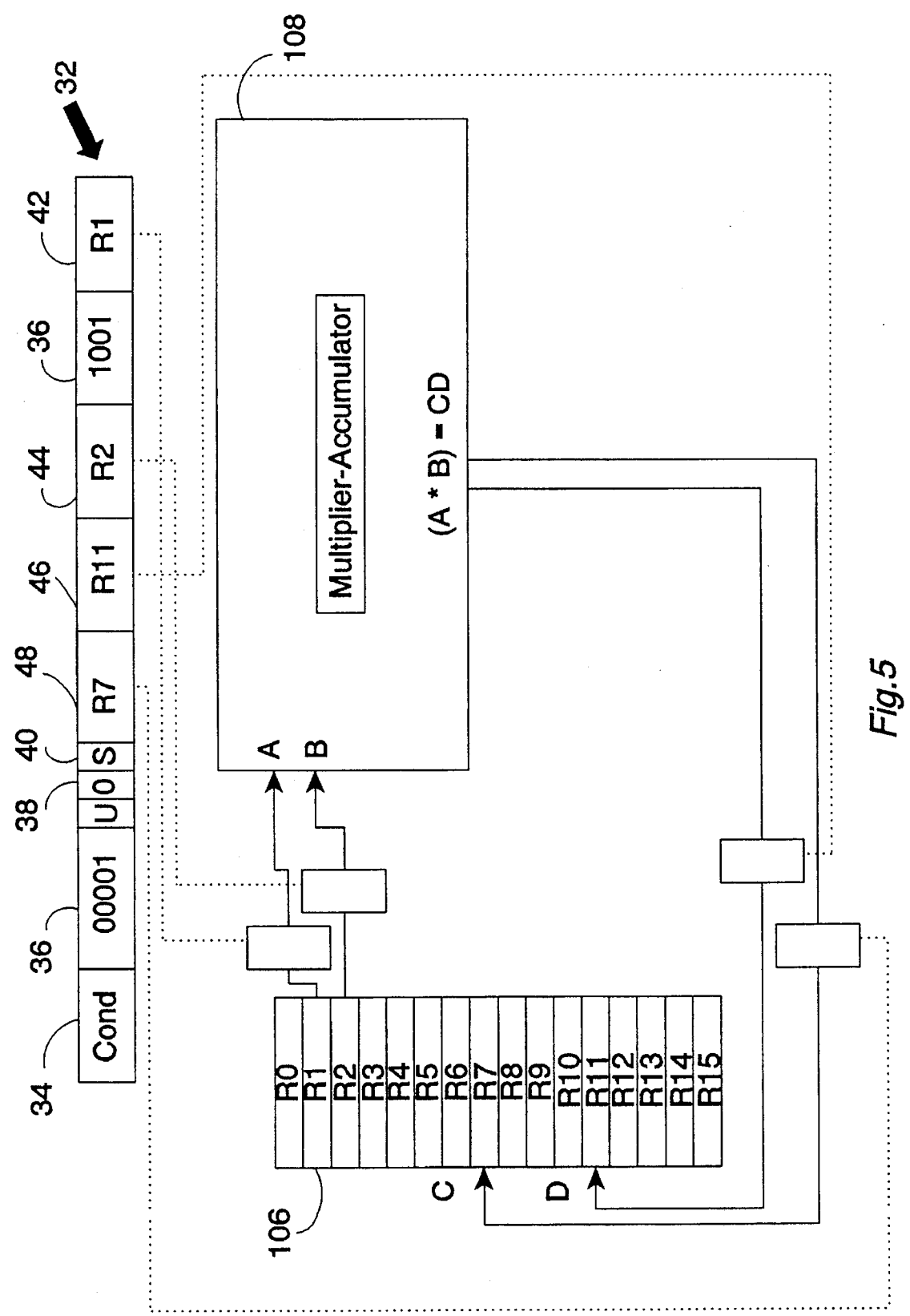

FIG. 5 illustrates a second class of multiply instructions in which a 64-bit result is produced (i.e. 32×32→64). In this case, all four register fields 42, 44, 46 and 48 are utilized to specify the registers from which the input variables are taken and the registers to which the respective high and low portions of the 64-bit result CD are written.

Figure 6A:
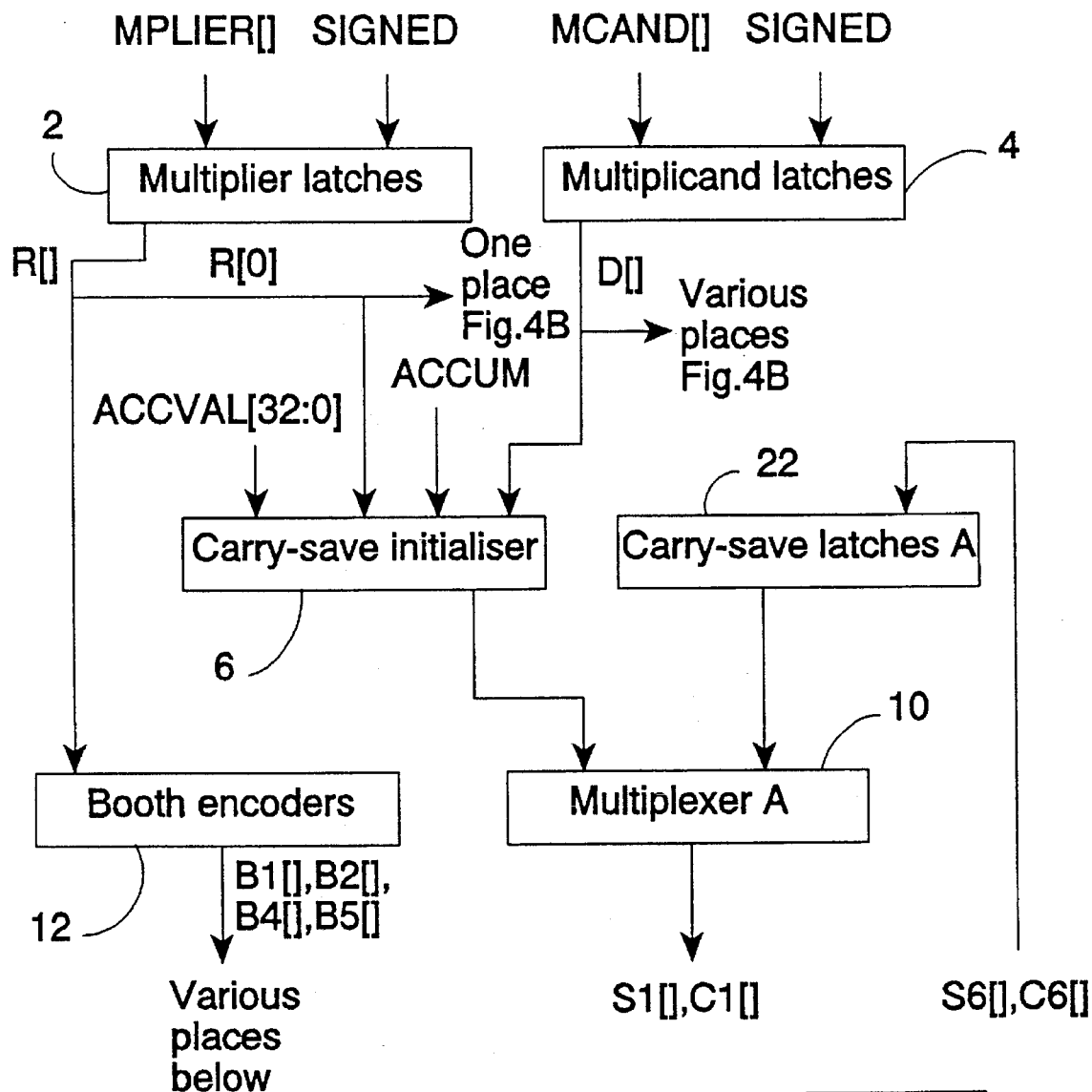
FIGS. 6A and 6B illustrate portions of a multiplier-accumulator unit.
Figure 6B:
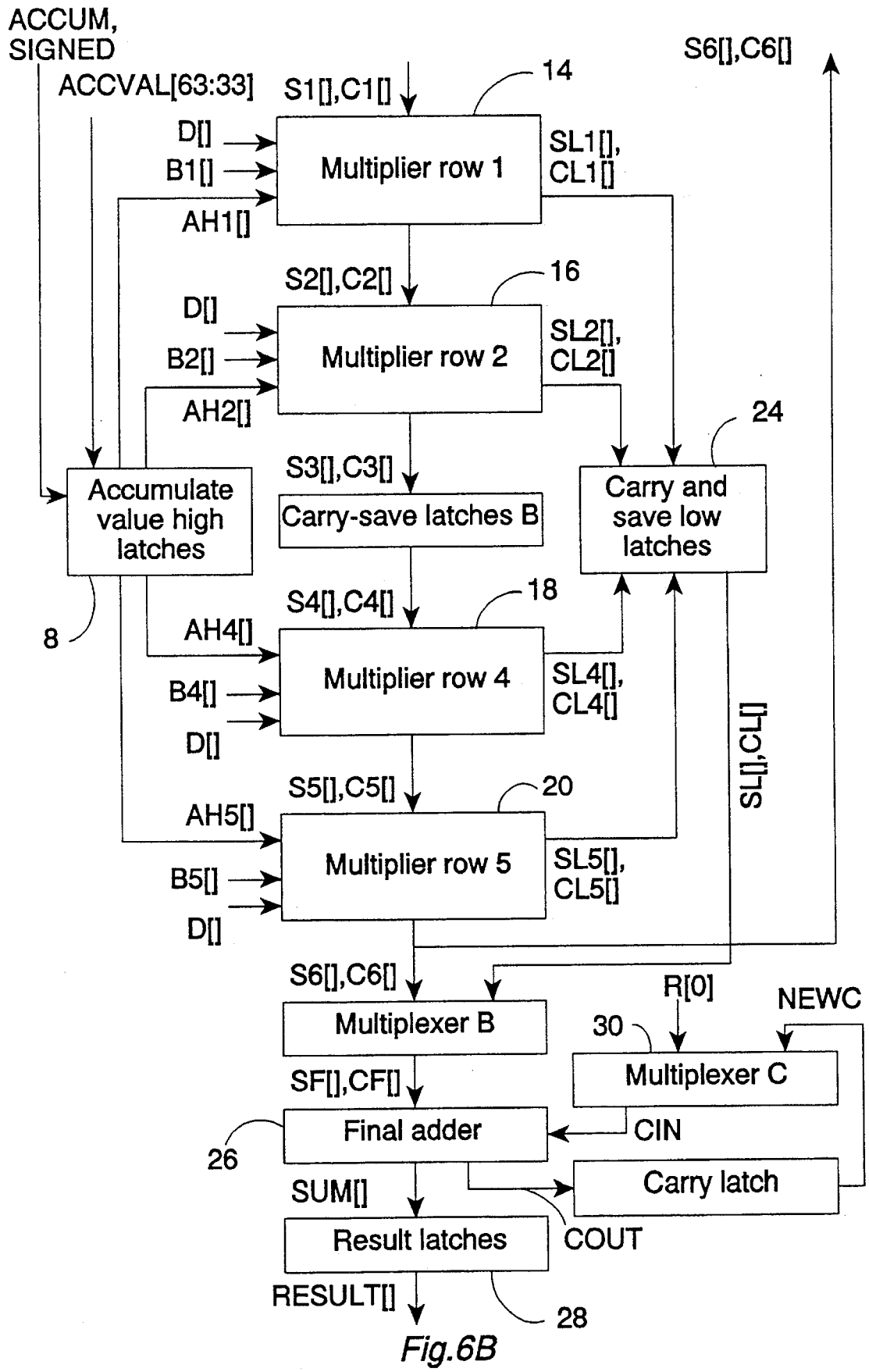

FIGS. 6A and 6B illustrate different portions of a circuit for performing a multiply-accumulate operation.

The described circuits implement a multiplier-accumulator that can handle:

(1) Multiplications of N-bit and N-bit numbers to produce an N-bit product;
(2) Multiplications of N-bit and N-bit numbers to produce a 2N-bit result;
(3) Multiply-accumulate operations which multiply together an N-bit number and an N-bit number and add an N-bit accumulate value to produce an N-bit result; and
(4) Multiply-accumulate operations which multiply together an N-bit number and an N-bit number and add a 2N-bit accumulate value to produce a 2N-bit result.

The circuits can supply all of these in signed and unsigned variants. The described circuits use the exemplary specific case of N=32. (i.e. 32×32→32 and 32×32→64 multiplications, and 32×32+32→32 and 32×32+64→64 multiply-accumulates).

The term "multiplier" is used below both for the multiplier circuit and for one of the two operands to the multiplication. It will be clear which is intended, either from the use of "circuit" or "operand" or from the context.

Multiplication of an N-bit multiplicand D by an N-bit multiplier R is usually performed in hardware as two major steps:

(1) Form a collection of multiples X0*D, X1*D, ..., Xk*D of the multiplicand D such that (a) each multiple can be generated easily; (b) X0+X1+ ... +Xk=R, which ensures that the sum of X0*D, X1*D, ... and Xk*D is equal to R*D, the desired product.
(2) Add the multiplicand multiples generated by step (1) together.

Stage (1): Forming the multiplicand multiples

Stage (1) can be performed in various ways. The simplest is to make k=N−1 (so that there are N multiplicand multiples in total), then let Xi=0 if bit i of R (which will be denoted by R[i] or Ri) is 0 and $Xi=2^i$ if R[i] is 1. Because every Xi is zero or a power of two, the multiplicand multiples Xi*D can be formed easily, by using either zero or the result of shifting D left by i bits.

Since the result of the multiplication is longer than either operand, the Xi*D multiplicand multiples should be created with enough bits to determine all the bits of the product: this requires extending the multiplicand with bits on its left. This is the point at which one may cater for the difference between a signed and an unsigned multiplicand: a signed multiplicand is extended with copies of its sign bit, while an unsigned multiplicand is extended with zeros. This extension of the multiplicand is often physically implemented by just extending it with a single zero or copy of the sign bit, with the understanding that this single extra bit represents the (common) value of all the remaining bits.

Dealing with the difference between an unsigned and a signed multiplier R under this scheme is somewhat trickier. First, note that the Xi sum to the unsigned value of R: this scheme is "naturally" an unsigned multiplication algorithm. So what is needed is a way of dealing with a signed multiplier. There are a number of ways of dealing with this, most of which come down to either (a) adjusting the final result by subtracting an extra $2^N*D$ if R is negative; or (b) making Xk be $-2^k$ rather than $+2^k$ if R[k]=1, i.e. if R is negative.

A more sophisticated technique is modified Booth encoding. This comes in two slightly different forms, depending on whether N is even or odd. If N is even, we let $k=N/2-1$ (so we will form N/2 multiplicand multiples), and then define:

$$X0=-2*R[1]+R[0]$$

and:

$$Xi=(-2*R[2*i+1]+R[2*i]+R[2*i-1])*2^{(2*i)}$$

for i=1,2, ... ,k.

Another way of looking at this is that we extend the multiplier with a single bit R[-1] after the binary point, and set R[-1] to be zero (which leaves the value of the multiplier unchanged). The second formula above can then be applied to the case i=0 as well, and simplifies to the first formula above in that case, i.e. the apparent special case for X0 can be got rid of by this definition or R[-1] as 0).

The sum of the Xi is then equal to the signed value of R:

$$\begin{aligned}&Xk + X[k-1] + \ldots + X2 + X1 + X0 \\ &= -2^{(2*k+1)}*R[2*k+1] + 2^{(2*k)}*R[2*k] + 2^{(2*k)}*R[2*k-1] \\ &\quad -2^{(2*k-1)}*R[2*k+1] + 2^{(2*k-2)}*R[2*k-2] + 2^{(2*k-2)}*R[2*k-3] \\ &\quad - \ldots \\ &\quad -32*R[5] + 16*R[4] + 16*R[3] \\ &\quad -8*R[3] + 4*R[2] + 4*R[1] \\ &\quad -2*R[1] + R[0] \end{aligned}$$

$$\begin{aligned}&= -2^{(2*k+1)}*R[2*k+1] + 2^{(2*k)}*R[2*k] \\ &\quad +2^{(2k-1)}*R[2*k-1] + 2^{(2*k-2)}*R[2*k-2] \\ &\quad + \ldots \\ &\quad +32*R[5] + 16*R[4] \\ &\quad +8*R[3] + 4*R[2] \\ &\quad +2*R[1] + R[0] \end{aligned}$$

$$\begin{aligned}&= -2^{(N-1)}*R[N-1] + 2^{(N-2)}*R[N-2] \\ &\quad +2^{(n-3)}*R[N-3] + 2^{(N-4)}*R[N-4] \\ &\quad + \ldots \\ &\quad +32*R[5] + 16*R[4] \\ &\quad +8*R[3] + 4*R[2] \\ &\quad +2*R[1] + R[0] \end{aligned}$$

= signed value of R.

Furthermore, each Xi is a power of two times a number from the set $\{-2, -1, 0, 1, 2\}$, so must have a value of zero, a power of two or minus a power of two. This makes the multiplicand multiples Xi*D easy to form. They are not quite as easy as for the earlier method, since we have to cope with negative powers of two as well as positive ones, but we get the substantial advantage of only having N/2 multiplicand multiples to add together in the second stage, rather than N of them. Forming a negative multiplicand multiple may be done by shifting the multiplicand to form the corresponding positive multiple, then negating by the "take the 1's complement and add 1" method—except that rather than performing the addition of 1 at this stage, we relegate it to the second stage. We therefore end up with N/2 multiplicand multiples and N/2 single bits (which are zero if the corresponding multiplicand multiple is positive and 1 if it is negative) to add in the second stage; this is still a substantial improvement over N full multiplicand multiples.

If N is odd, we do something very similar, except that K=(N-1)/2 and the formulae For the Xi are:

$$X0=-R[0]$$

and:

$$Xi=(-2*R[2*i]+R[2*i-1]+R[2*i-2])*2^{(2*i-1)}$$

for i=1,2, ... ,k. (Again, the formula for X0 is not really a special case: we just have to define R[-1]=R[-2]=0 to make the second formula produce the right value).

As well as the fact that modified Booth encoding produces half as many multiplicand multiples to add together, it has another advantage: it naturally treats the multiplier as a signed number rather than an unsigned one. With the earlier technique, we had to deal with a signed multiplier as a special case, because no matter how long we make an unsigned number, it cannot hold a negative signed value. The converse is easier: a signed number of length N+1 bits or more can hold an unsigned value of length N bits (or indeed a signed value of length N bits). So if we want a multiplier circuit that can handle both signed and unsigned 32-bit multipliers, for instance, a 33-bit or longer modified Booth encoder will do the job: all we have to do is extend the multiplier with one or more additional bits at its left end, making these bits zero if the multiplier is to be treated as unsigned and copies of the existing sign bit if the multiplier is to be treated as signed.

Dealing with the difference between a signed and an unsigned multiplicand is still done by the same technique as before.

Other, yet more sophisticated ways to form the multiplicand multiples also exist, which reduce their number yet further at the expense of more complexity.

Stage (2): Adding the multiplicand multiples

After stage (1), we have some fairly large number of multiplicand multiples to add together—e.g. 17 in the case that we are using a 33-bit or 34-bit modified Booth encoder for a circuit that can do both signed and unsigned 32×32 multiplication.

The simplest technique is just to add two of them together, add a third to the sum of the first two, add the fourth to the resulting sum, etc., until we have got the final sum. (Incidentally, each addition can also deal with one of the extra bits generated by the modified Booth encoding, by using it as the carry input to the adder. So we don't need extra additions to cope with these bits). This is similar to the technique used by the ARM6 microprocessor of Advanced RISC Machines Limited.

One difference is that we don't generate all the multiplicand multiples at once: instead, we generate them as needed. The other main difference deals with an irregularity in this technique: we have to generate two multiplicand multiples before we can do the first addition, but only one before each of the other additions. This can be (and is) exploited in order to provide a multiply-accumulate function without this irregularity by initializing the "sum so far" to be the accumulate value, then repeatedly generating one multiplicand multiple and adding it into the sum so far. (To get a simple multiplication, we do the same, except that the sum so far is initialized to zero rather than to an accumulate value).

This also completes what was suggested in the previous paragraph: there was in fact one addition too few to deal with all the extra bits from the modified Booth encoder, and now there are the right number.

The main problem with this technique is that each addition takes a substantial amount of time, because of the long carry chain it contains. A good solution to this is "carry-save" addition, which arises from the observation that although adding two numbers and a carry bit to get one number necessarily involves a long carry chain, adding three numbers and a carry bit to get two numbers needn't. Specifically, if we have three numbers X[N:0], Y[N:0] and a carry bit W, we can reduce them to two numbers S[N:0]

and C[N+1:0] which add to the same value by simply doing a separate addition of 3 single bits in each bit column:

```
X[N] X[N-1] X[N-2] ... X[3] X[2] X[1] X[0]
Y[N] Y[N-1] Y[N-2] ... Y[3] Y[2] Y[1] Y[0]
Z[N] Z[N-1] Z[N-2] ... Z[3] Z[2] Z[1] Z[0]
                    W
------------------------------------------have same sum as
     S[N] S[N-1] S[N-2] ... S[3] S[2] S[1] S[0]
C[N+1] C[N] C[N-1] C[N-2] ... C[3] C[2] C[1] C[0]
``` where:
C[0]=W and
for i=0,1, ... N:
$(C[i+1],S[i])$ is the two bit sum of $X[i]$, $Y[i]$ and $Z[i]$ Because the calculations are done separately for each column, with no carry chain, this is considerably faster than ordinary addition. (For instance, the multiplication on the ARM6 microprocessor uses ordinary addition and managed one of them per clock cycle. An integrated circuit using carry-save addition may manage four or more additions per clock cycle.)

If we have J multiplicand multiples to add, we can use this technique J-2 times to reduce them to just two numbers that we have to add to get the final result. This final addition will require an ordinary addition, but the overall total of J-2 carry-save additions and one ordinary addition is a considerable improvement over the original J-1 ordinary additions.

The normal approach is similar to that for the ordinary adders: we will initialize the "carry" and "save" values so that their sum is zero (e.g. by initializing them both to zero), then use carry-save additions to add in the multiplicand multiples one by one. At the end, we use a normal addition to Form the Final sum of the "carry" and "save" values. As before, we can get a multiply-accumulate operation for free, by initializing the "carry" and "save" values so that their sum is the accumulate value—e.g. make one of them zero and the other the accumulate value. Indeed, because there are two values to initialize, we could add in two accumulate values, but this is not very useful: a better way to make use of this second accumulate value slot is described later.

Everything above assumes that we are doing 2N-bit additions—e.g. that if we are implementing a 32×32 multiplication, we will be doing 64-bit additions. This is awkward, because it typically results in us needing a datapath section which is twice as wide as the rest of the datapath.

However, if we look at the values we are adding in, we find they only contain a slightly more than N-bit region where the value is "interesting". For instance, consider Xi*D For a modified Booth encoder with N odd. Xi is one of $-2^{(2*i)}$, $-2^{(2*i-1)}$, $0$, $2^{(2*i-1)}$ and $2^{(2*i)}$, which correspond to Xi*D being one of:

| Xi | Top N-2*i bits | Middle N+1 bits | Bottom 2*i-1 bits |
|---|---|---|---|
| $-2^{(2*i)}$ | All inverse of multiplicand sign | Inverted multiplicand followed by 1 | All 1, with carry bit of 1 |
| $-2^{(2*i-1)}$ | All inverse of multiplicand sign | Inverted multiplicand sign followed by inverted multiplicand | All 1, with carry bit of 1 |
| 0 | All zero | All zero | All 0, with carry bit of 0 |
| $2^{(2*i-1)}$ | All equal to multiplicand sign | Multiplicand sign followed by multiplicand | All 0, with carry bit of 0 |
| $2^{(2*i)}$ | All equal to multiplicand sign | Multiplicand followed by 0 | All 0, with carry bit of 0 |

Both the top N-2*i and the bottom 2*i-1 bits are not very interesting. In particular, we can add the carry bit into the bottom 2*i-1 bits to get all zeros and the same carry into the middle N+1 bits in each case—i.e. replace the above by:

| Xi | Top N-2*i bits | Middle N+1 bits | Bottom 2*i-1 bits |
|---|---|---|---|
| $-2^{(2*i)}$ | All inverse of multiplicand sign | Inverted multiplicand followed by 1, with carry bit of 1 | All zero |
| $-2^{(2*i-1)}$ | All inverse of multiplicand sign | Inverted multiplicand sign followed by inverted multiplicand with carry bit of 1 | All zero |
| 0 | All zero | All zero, with carry bit of 0 | All zero |
| $2^{(2*i-1)}$ | All equal to multiplicand sign | Multiplicand signal followed by multiplicand, with carry bit of 0 | All zero |
| $2^{(2*i)}$ | All equal to multiplicand sign | Multiplicand followed by 0, with carry bit of 0 | All zero |

We then find that we don't need to do the carry-save addition on the bottom 2*i-1 bits: rather than doing a carry-save addition of two values and zero, we can just leave the two values unchanged. Furthermore, provided the top N-2*i bits of the "save" and "carry" values so far are all identical, all of the top N-2*i column additions will be identical, and so we only need one circuit to evaluate them all. As a result, we can do everything with just N+2 column adders (N+1 for the middle N+1 bits plus one for the top N-2*i bits) provided:

(a) We start with the "save" value having its top N bits identical;
(b) We start with the "carry" value having its top N bits identical;
(c) We add in the multiplicand multiples in the order X0*D, X1*D, X2*D, ..., xk*D, so that each addition requires a smaller number of identical bits at the top than the previous ones; and
(d) We shift our "area of interest" left by 2 bits each iteration, storing away the bits that drop off the bottom end. At the end of the calculation, these bits will form the low ends of the final "carry" and "save" values, while those in the last "area of interest" will form their high ends.

This allows us to implement the main part of the multiplier with just a slight "bulge" in the width of the datapath, not a doubling of its width. The final addition still has to be double width, but can be implemented by two uses of a single width adder, using the technique of using the carry-out bit from the first addition as the carry-in bit to the second addition.

Of the restrictions, the last two are a matter of implementing the circuit correctly. However, the first two mean that any accumulate value may be at most N bits wide if signed, rather than about 2N bits wide. A technique is described below to circumvent this restriction on the accumulate value, allowing the implementation e.g. of a 32×32+ 64 multiply-accumulate instruction rather than just 32×32+ 32.

Note that any particular multiplier may contain multiple instances of the hardware which generates a multiplicand multiple and does the carry-save addition into the current "carry" and "save" forms (this hardware will be called a "multiplier row" in what follows). At one extreme, there is the full multiplier array, with a separate multiplier row for each iteration.

At the other, there is the fully iterative multiplier, with just one multiplier row which handles all the iterations. In between, there are iterative versions with more than one row.

Initializing the carry-save form

As noted above, we can initialize both the "carry" and the "save" part of the carry-save form. One of them is wanted for the accumulate value. The other could be used For one of the multiplicand multiples. The main problem with this is that it means the carry-save form initializer will have to contain a multiplicand multiple generator. This costs some space; more important, it causes an extra initialization delay.

The magnitude of this extra delay depends on the complexity of generating the multiplicand multiple concerned. Looking at the formulae for the Xi generated by modified Booth encoding as set out above, one is particularly simple—namely that for N odd, X0=−R[0]. Typically, of course, we are interested in the N even case; however, as observed above, a good way of dealing with a requirement to multiply by both signed and unsigned N-bit numbers is in Fact to multiply by a signed (N+1)-bit number.

These observations lead to the following initialization method for an N-bit by N-bit multiplier-accumulator which handles both signed and unsigned variants, using modified Booth encoding and carry-save addition, with N even:

Initialize the internal multiplier operand R[N:0] by:

$R[N] = 0$     if unsigned variant wanted;

$= R[N-1]$   if signed variant wanted.

Initialize one of the "carry" and "save" values to the supplied N-bit or 2N-bit accumulate value (extended with zeros or copies of the sign bit according to whether it is unsigned or signed).

Initialize the other of the "carry" and "save" values to zero if R[0]=0, and to minus the supplied multiplicand (treated as signed or unsigned as appropriate) if R[0]=1.

This last appears slightly complicated by having to generate minus the supplied multiplicand—i.e. its 2's complement. It would be advantageous to use the trick of forming its 1's component and adding 1 instead. The problem is: when do we add this 1 in?

A good answer is at the end of the multiplication. The reason is that the final addition on the carry-save form currently just needs to add the "carry" and "save" parts of it together. Most adders will add two numbers and a carry bit, and the carry bit is therefore unused. By setting the carry bit equal to R[1], we can compensate for the difference between using the 2's complement and the 1's complement of the multiplicand during initialization when R[0]=1. So we get the following initialization method:

Initialize the internal multiplier operand R[N:0] by:

$R[N-1:0]$ = supplied multiplier operand;
$R[N] = 0$     if unsigned variant wanted;
        $R[N-1]$   if signed variant wanted.

Initialize one of the "carry" and "save" values to the supplied N-bit or 2N-bit accumulate value (treated as signed or unsigned as appropriate).

Initialize the other of the "carry" and "save" values to zero if R[0]=0, and to the bitwise inverse (i.e. 1's complement) of the supplied multiplicand (treated as signed or unsigned as appropriate) if R[0]=1.

Set the carry-in bit for the final addition to R[0].

Dealing with a long accumulate value

As stated above, the accumulate value can only be about N bits in length if we are able to represent all the top N−2*i bits at stage i of the multiplication with just a single bit. If the accumulate value is longer the datapath needs to be increased in width substantially to cope with it.

Note that in the top N−2*i bits, we initially only want one of the "carry" and "save" values to be able to contain non-identical bits: the other one can contain all identical bits, as can the top N−2*i bits of the multiplicand multiple. Unfortunately, after the top carry-save addition, both the "carry" and "save" values can contain strings of non-identical bits in their top bits. If this were not the case, and we could arrange that the top bits of the accumulate value were left unchanged by the addition and that the top bits of every other value remained a string of identical bits, we could again do the main work in a roughly N-bit wide datapath: the only difference from the previous state of affairs is that we would have to feed 2 bits of the accumulate value into the main calculation per iteration.

The way we will deal with this is by modifying the simple carry-save "add three bits in each column" technique. In the same way as above, we will split the "carry" and "save" values up into three regions:

(a) A "low" region, in which no further change is going to be made to the "carry" and "save" values. After adding Xi*D into them, this region contains Li bits, where Li=2*i+1 in the N odd case (illustrated in the above) and Li=2*i+2 in the N even case. In the N even case, this can also be expressed by saying that Li=2*i before Xi*D is added; in the N odd case, it can also be expressed by saying that Li=2*i−1 before Xi*D is added, provided a special case is made for i=0 (e.g. by putting the addition of X0*D into the initialization, as described in the above); SL[Li−1:0] and CL[Li−1:0] denote the low "save" and "carry" bits respectively.

(b) A "middle" or "active" region, in which the main carry-save additions are taking place. This region contains N+1 bits, denoted S[N:0] and C[N:0] for the "save" and "carry" values respectively.

(c) A "high" region, in which the "save" value contains as-yet-unused bits of the accumulate value and the "carry" value is simply a string of copies of C[N]. Before adding Xi*D into the carry save form, this region is 2*(k−1)+2 bits long—i.e. the number of accumulate bits we still want to bring into the active region at 2 bits per addition (recall that k is the index of the last Xi).

As a check, the total length of the "carry" and "save" values is:

when $N$ is even:    $Li + (N+1) + (2*(k-i) + 2)$
                    $= 2*i + N + 1 + 2*k − 2*i + 2$
                    $= N + 1 + 2*(N/2 − 1) + 2$
                    $= N + N + 1$ when $N$ is odd:    $Li + (N+1) + (2*(k-i) + 2)$
                   $= 2*i + N + 1 + 2*k − 2*i + 2$
                   $= −1 + N + 1 + 2*((N−1)/2) + 2$
                   $= N + N + 1$ so we will naturally deal with an accumulate value A[2N:0] of length 2N+1 bits. (We can of course deal with shorter accumulate values (e.g. N-bit) simply by zero-extending them or sign-extending them as appropriate; we can also deal with longer accumulate values, though the excess bits will be completely unchanged by the main operation and simply need to be added to the corresponding "carry" value bits (i.e. copies of C[N]) during the final addition).

So before we add Xi*D into the carry-save form, the "save" and "carry" values will be:

|  | "High" region | "Active" region | "Low" region |
|---|---|---|---|
| "save" value: | A[2N:Li+N+1] | S[N:0] | SL[Li−1:0] |
| "carry" value: | C[N],C[N], . . . C[N] | C[N:0] | CL[Li−1:0] |

Next, we need to look at what the multiplicand multiple is like. We start with an N bit signed or unsigned multiplicand D[N−1:0], which we sign-extend or zero-extend respectively to form an (N+1)-bit signed multiplicand D[N:0]. When we form the multiplicand multiple as described in the above, we get the following forms for the multiplicand multiple, depending on the value of the "Booth digit" −2*R[2*i+1]+R[2*i]+R[2*i−1] (for N even) or −2*R[2*i]+R[2*i−1]+R[2*i−2] (for N odd):

| Booth digit | "High" region | "Active" region | "Low" region |
|---|---|---|---|
| −2 | I[N],I[N], . . . ,I[N] | I[N−1:0],1;carry=1 | 0,0, . . . ,0 |
| −1 | I[N],I[N], . . . ,I[N] | I[N:0]; carry=1 | 0,0, . . . ,0 |
| 0 | 0,0, . . . ,0 | 0,0, . . . 0; carry=0 | 0,0, . . . ,0 |
| 1 | D[N],D[N], . . . ,D[N] | D[N:0]; carry=0 | 0,0, . . . ,0 |
| 2 | D[N],D[N], . . . ,D[N] | D[N−1:0],0; carry=0 | 0,0, . . . ,0 | where I[N:0] is the bitwise inverse (or 1's complement) of D[N:0]

These are all of the form:

| "High" region | "Active" region | "Low" region |
|---|---|---|
| X[N+1],X[N+1], . . . X[N+1] | X[N:0] | 0,0, . . . ,0 |
| 0,0, . . . ,0 | 0,0, . . . ,0,XC | 0,0, . . . ,0 |

We wish to end up with "carry" and "save" values of the same form, but with i one greater, and thus Li two greater. In the process, we are going to generate new values for S[N:0] and C[N:0], which will be called S'[N:0] and C'[N:0] respectively. We will also generate SL[Li+1:Li], which are two new bits of SL[], but will not disturb the existing bits SL[Li−1:0]. Similarly, we will generate two new bits CL[Li+1:Li], but will not disturb the existing bits CL[Li−1:0]. Finally, the two lowest bits of A[2N:Li+N+1] will be consumed, so we want our modified carry-save addition to produce a result of the form:

|  | new "High" region | new "Active" region | new "Low" region |
|---|---|---|---|
| "save" value | A[2N:Li+N+3] | S'[N:0] | SL[Li+1:0] |
| "carry" value | C'[N],C'[N], . . . ,C'[N] | C'[N:0] | CL[Li+1:0] |

Matching the addition we wish to perform up against this, we find we wish our modified carry-save addition to be of the following form:

| "High" region | Transition bits | | "Active" region | Transition bits | | "Low" region |
|---|---|---|---|---|---|---|
| A[2N:Li+N+3] | A[Li+N+2] | A[Li+N+1] | S[N:2] | S[1] | S[0] | SL[Li−1:0] |
| C[N], . . . ,C[N] | C[N] | C[N] | C[N:2] | C[1] | C[0] | CL[Li−1:0] |
| X[N+1], . . . X[N+1] | X[N+1] | X[N+1] | X[N:2] | X[1] | X[0] | 0,0, . . . ,0 |
| 0, . . . ,0 | 0 | 0 | 0, . . . ,0 | 0 | XC | 0,0, . . . ,0 |
| A[2N:Li+N+3] | S'[N] | S'[N−1] | S'[N−2:0] | SL[Li+1] | SL[Li] | SL[Li−1:0] |
| C'[N], . . . , C'[N] | C'[N] | C'[N−1] | C'[N−2:0] | CL[Li+1] | CL[Li] | CL[Li−1:0] |

| "High" region | "Active" region | "Low" region |
|---|---|---|
| X[N+1],X[N+1], . . . X[N+1] | X[N:0]; carry=XC | 0,0, . . . ,0 | for some values of X[N+1:0] and XC. So the addition we wish to perform is of the form:

| "High" region | "Active" region | "Low" region |
|---|---|---|
| A[2N:Li+m+1] | S[N:0] | SL[Li−1:0] |
| C[N],C[N], . . . ,C[N] | C[N:0] | CL[Li−1:0] |

We can immediately eliminate the "low" region because the contribution this region will make to the final sum is unchanged. Similarly, we can eliminate the bits A[2N:Li+N+3] which appear in the same positions both above and below the line: their contribution to the final form is again obviously unchanged. After this, we find that our modified carry-save addition must be of the form:

| "High" region | Transition bits | | "Active" region | Transition bits | |
|---|---|---|---|---|---|
| 0, . . . ,0 | A[Li+N+2] | A[Li+N+1] | S[N:2] | S[1] | S[0] |
| C[N], . . . ,C[N] | C[N] | C[N] | C[N:2] | C[1] | C[0] |
| X[N+1], . . . ,X[N+1] | X[N+1] | X[N+1] | X[N:2] | X[1] | X[0] |
| 0, . . . ,0 | 0 | 0 | 0, . . . ,0 | 0 | XC |
| 0, . . . ,0 | S'[N] | S'[N−1] | S'[N−2:0] | SL[Li+1] | SL[Li] |
| C'[N], . . . ,C'[N] | C'[N] | C'[N−1] | C'[N−2:0] | CL[Li+1] | CL[Li] |

Next, we do some ordinary carry-save addition on the "active" region and the two transition bits below it. By doing the operations:

| | | |
|---|---|---|
| CL[Li] | = | XC; |
| (CL[Li+1],SL[Li]) | = | two bit sum of S[0], C[0] and X[0]; |
| (C'[0],SL[Li+1]) | = | two bit sum of S[1], C[1] and X[1]; |
| For i = 2,3, . . . ,N: | | |
| (C'[i−1],S'[i−2]) | = | two bit sum of S[i], C[i] and X[i]; | we ensure that S'[N−2:0], SL[Li+1], SL[Li], C'[N−1:0], CL[Li+1] and CL[Li] make the same contribution to the final sum below the line as S[N:0], C[N−1:0], X[N:0], XC and the "active region" copy of C[N] make above the line. So we can now eliminate all of these, together with all the zeros on the line containing XC, and the remainder of our modified carry-save addition must be of the form:

| "High" region | Transition bits | |
|---|---|---|
| 0, . . . ,0 | A[Li+N+2] | A[Li+N+1] |
| C[N]. , , , .C[N] | C[N] | C[N] |
| X[N+1], . . . X[N+1] | X[N+1] | X[N+1] |
| 0, . . . 0 | S'[N] | S'[N−1] |
| C'[N], . . . ,C'[N] | C'[N] | 0 |

At this point, we make some mathematical modifications to this remaining sum. First, we can replace its second line by the sum of the following two lines:

| | | |
|---|---|---|
| 1, . . . ,1 | 1 | 1 |
| 0, . . . ,0 | 0 | NOT(C[N]) |

Proof: if C[N] is 1, this is the sum of a row of all ones and a row of all zeros, which is a row of all ones. Conversely, if C[N] is 0, this is the sum of a row of all ones and a single one at its right hand end. This produces a row of all zeros plus a carry out of the left hand end. The carry out will be ignored, because it is outside the region in which we are doing the addition. So in either case, the sum is a row of copies of C[N].

Similarly, the third line can be replaced by the sum of the following two lines:

| | | |
|---|---|---|
| 1, . . . ,1 | 1 | 1 |
| 0, . . . ,0 | 0 | NOT(X[N+1]) |

This modifies the required carry-save addition to be of the form:

| "High" region | Transition bits | |
|---|---|---|
| 0, . . . ,0 | A[Li+N+2] | A[Li+N+1] |
| 1, . . . ,1 | 1 | 1 |
| 0, . . . ,0 | 0 | NOT(C[N]) |
| 1, . . . ,1 | 1 | 1 |
| 0, . . . 0 | 0 | NOT(X[N+1]) |
| 0, . . . ,0 | S'[N] | S'[N−1] |
| C'[N], . . . ,C'[N] | C'[N] | 0 |

Next, we add the two rows of ones, again ignoring the carry out because it is outside the region in which we are doing the addition. This changes the required carry-save addition to be of the form:

| "High" region | Transition bits | |
|---|---|---|
| 0, . . . ,0 | A[Li+N+2] | A[Li+N+1] |
| 1, . . . ,1 | 1 | 0 |
| 0, . . . ,0 | 0 | NOT(C[N]) |
| 0, . . . ,0 | 0 | NOT(X[N+1]) |
| 0, . . . ,0 | S'[N] | S'[N−1] |
| C'[N], . . . ,C'[N] | C'[N] | 0 |

At this point, if we do the operation:

$(S'[N], S'[N-1])$ = two bit sum of $A[Li+N+1]$, $NOT(C[N])$ and $NOT(X[N+1])$

We will find that we can eliminate all these bits from the required addition, together with some zeros, which just leaves:

| "High" region | Transition bit |
|---|---|
| 0, . . . ,0 | A[Li+N+2] |
| 1, . . . ,1 | 1 |
| C'[N], . . . . C'[N] | C'[N] |

And finally, if we do the operation:

C'[N]=NOT(A[Li+N+2])

we solve this remaining part of the addition sum, by the reverse of the argument which said that we could replace a row of all C[N]s by a row of all 1s and a row containing just NOT(C[N]) in its rightmost position.

Overall conclusion: by performing the set of operations:

| | | |
|---|---|---|
| $CL[Li]$ | $=$ | $XC;$ |
| $(CL[Li+1], SL[Li])$ | $=$ | two bit sum of $S[0]$, $C[0]$ and $X[0]$ |
| $(C'[0], SL[Li+1])$ | $=$ | two bit sum of $S[1]$, $C[1]$ and $X[1]$; |

For $i = 2, 3, \ldots, N:$

| | | |
|---|---|---|
| $(C'[i-1], S'[i-2])$ | $=$ | two bit sum of $S[i]$, $C[i]$ and $X[i]$; |
| $(S'[N], S'[N-1])$ | $=$ | two bit sum of $A[Li+N+1]$, $NOT(C[N])$ and $NOT(X[N+1])$ |
| $C'[N]$ | $=$ | $NOT(A[Li+N+2])$ | we can implement a modified carry-save addition for our desired operation:

| "High" region | Transition bits | | Active region | Transition bits | | "Low" region |
|---|---|---|---|---|---|---|
| A[2N:Li+N+3] | A[Li+N+2] | A(Li+N+1] | S[N:2] | S[1] | S[0] | SL[Li–1:0] |
| C[N], ... ,C[N] | C[N] | C[N] | C[N:2] | C[1] | C[0] | CL[Li–1:0] |
| X[N+1], ... X[N+1] | X[N+1] | X[M+1] | X[M:2] | X[1] | X[0] | 0,0, ... ,0 |
| 0, ... ,0 | 0 | 0 | 0, ... ,0 | 0 | XC | 0,0, ... ,0 |
| | | | | | | + |
| A[2N:Li+M+3] | S'[M] | S'[M–1] | S'[N–2:0] | SL[Li+1] | SL[Li] | SL[Li–1:0] |
| C'[N], ... , C'[N] | C'[N] | C'[N–1] | C'[N–2:0] | CL[Li+1] | CL[Li] | CL[Li–1:0] |

Thus, provided we can initialize the "save" and "carry" values correctly, we can perform an N-bit by N-bit multiply-accumulate operation with an (2N+1)-bit accumulate value, by initializing, adding in multiplicand multiples using the above modified carry-save addition and then doing a final addition on the carry-save value.

An example multiplier will now be described which uses the above to yield 32×32→64 multiplications and 32×32+64→64 multiply-accumulate operations in both signed and unsigned versions. 32×32→32 and 32×32+32→32 operations may be produced by early terminating the multiplication after the lowest 32 bits have been determined and by initializing the accumulate value with only the lowest 32 bits.

Further possible refinements not illustrated in this example would be:
* Early termination, which essentially involves detecting when all the remaining multiplicand multiples will be zero (so that no more additions are actually required), then doing some rather messy rearrangement of the bits in the "low", "active" and "high" regions in order to produce the correct final additions.
* Avoiding the need for the final adder in this circuit, by using another adder which may be present on the datapath anyway, e.g. as part of an ALU.
* One could take advantage of the fact that the "save low latches" fill from the bottom up at 2 bits/multiplier row, while the "accumulate value high latches" empty from the bottom up at the same rate, to use the same physical register to hold both values. At the start, it contains the high part of the accumulate value; at the end, it contains the low part of the "save" value; in between, it contains the as-yet-unconsumed high accumulate value bits and the so-far-generated low "save" value bits. This is a useful improvement to the circuit.

The multiplier uses the following inputs:
MPLIER[31:0]—the multiplier operand;
MCAND[31:0]—the multiplicand operand;
ACCVAL[63:0]—the accumulate value;
SIGNED—a single bit which is 1 if a signed operation is to be performed, 0 if an unsigned operation is to be performed;
ACCUM—a single bit which is 1 if a multiply-accumulate is to be performed, 0 if just a multiply is to be performed. plus control inputs to cause the correct sequence of events to occur.

The circuit produces RESULT[63:0] as its result.

A basic block diagram of this multiplier is as shown in FIGS. 6A and 6B (for the sake of clarity, the control signals are not shown):

This multiplier calculates MPLIER[31:0]*MCAND[31:0]+ACCVAL[63:0] in five cycles, with the various blocks performing the following functions on each cycle:

Multiplier latches

| | | |
|---|---|---|
| Cycle 1: | R[31:0] | = MPLIER[31:0] |
| | R[32] | = SIGNED AND MPLIER[31] |
| Cycles 2–5: | No change | |

Multiplicand latches

| | | |
|---|---|---|
| Cycle 1: | D[31:0] | = MCAND |
| | D[32] | = SIGNED AND MCAND[31] |
| Cycles 2–5: | No change | |

Carry-save initialiser

| | | |
|---|---|---|
| Cycle 1: | For i=0,1, ... ,32: | SI[i]= ACCUM AND ACCVAL[i] CI[i]= R[0] AND NOT (D[i]) |
| Cycles 2–5: | No change | |

Carry-save latches A

| | |
|---|---|
| Cycles 1–3: | On phase 2, S0[32:0] and C0[32:0] are loaded from S6[32:0] and C6[32:0] respectively |
| Cycles 4–5: | No change |

Carry-save latches B

| | |
|---|---|
| Cycles 1–4: | On phase 1, S4[32:0] and C4[32:0] are loaded from S3[32:0] and C3[32:0] respectively |
| Cycle 5: | No change |

Multiplexer A

| | |
|---|---|
| Cycle 1: | S1[32:0] = SI[32:0] |
| | C1[32:0] = CI[32:0] |
| Cycles 2–5: | S1[32:0] = S0[32:0] |
| | C1[32:0] = C0[32:0] |

-continued

Booth encoders

Cycle 1:  B1[4:0] = BoothEnc(R[2:0])
          B2[4:0] = BoothEnc(R[4:2])
          B4[4:0] = BoothEnc(R[6:4])
          B5[4:0] = BoothEnc(R[8:6])
Cycle 2:  B1[4:0] = BoothEnc(R[10:8])
          B2[4:0] = BoothEnc(R[12:10])
          B4[4:0] = BoothEnc(R[14:12])
          B5[4:0] = BoothEnc(R[16:14])
Cycle 3:  B1[4:0] = BoothEnc(R[18:16])
          B2[4:0] = BoothEnc(R[20:18])
          B4[4:0] = BoothEnc(R[22:20])
          B5[4:0] = BoothEnc(R[24:22])
Cycle 4:  B1[4:0] = BoothEnc(R[26:24])
          B2[4:0] = BoothEnc(R[28:26])
          B4[4:0] = BoothEnc(R[30:28])
          B5[4:0] = BoothEnc(R[32:30])
Cycle 5:  No change where the BoothEnc function is specified by the following table:

| Input bits: | | | Output bits: | | | | |
|---|---|---|---|---|---|---|---|
| 2 | 1 | 0 | 4 | 3 | 2 | 1 | 0 |
| 0 | 0 | 0 | 0 | 0 | 1 | 0 | 0 |
| 0 | 0 | 1 | 0 | 1 | 0 | 0 | 0 |
| 0 | 1 | 0 | 0 | 1 | 0 | 0 | 0 |
| 0 | 1 | 1 | 1 | 0 | 0 | 0 | 0 |
| 1 | 0 | 0 | 0 | 0 | 0 | 0 | 1 |
| 1 | 0 | 1 | 0 | 0 | 0 | 1 | 0 |
| 1 | 1 | 0 | 0 | 0 | 0 | 1 | 0 |
| 1 | 1 | 1 | 0 | 0 | 1 | 0 | 0 |

Multiplier rows 1, 2, 4 and 5

On all cycles, multiplier row k takes inputs D[32:0], Bk[4:0], AHk[1:0], Sk[32:0] and Ck[32:0] and produces outputs S(k+1)[32:0], C(k+1)[32:0], SLk[1:0] and CLk[1:0] according to the following equations:

First use multiplexers to generate X[33:0] and XC according to the following table:

| Bk | | | | | X[33] | X[32:1] | X[0] | XC |
|---|---|---|---|---|---|---|---|---|
| [4] | [3] | [2] | [1] | [0] | | | | |
| 0 | 0 | 0 | 0 | 1 | NOT(D[32]) | NOT(D[31:0]) | 1 | 1 |
| 0 | 0 | 0 | 1 | 0 | NOT(D[32]) | NOT(D[32:1]) | NOT(D[0]) | 1 |
| 0 | 0 | 1 | 0 | 0 | 0 | 0,0,...,0 | 0 | 0 |
| 0 | 1 | 0 | 0 | 0 | D[32] | D[32:1] | D[0] | 0 |
| 1 | 0 | 0 | 0 | 0 | D[32] | D[31:0] | 0 | 0 |

Then:

| | | |
|---|---|---|
| CLk[0] | = | XC; |
| (CLk[1],SLk[0]) | = | two bit sum of Sk[0], Ck[0] and X[0]; |
| (C(k+1)[0],SLk[1]) | = | two bit sum of Sk[1], Ck[1] and X[1]; |
| For i=2,3,...,32: | | |
| (C(k+1)[i−1],S(k+1)[i−2]) | = | two bit sum of Sk[i], Ck[i] and X[i]; |
| (S(k+1)[32],S(k+1)[31]) | = | two bit sum of AHk[0], NOT(Ck[32]) and NOT(X[33]) |
| C(k+1)[32] | = | NOT(AHk[1]) |

Accumulate value high latches

These contain internal signals ACCHI[31:0]

| | |
|---|---|
| Cycle 1: | For i=0,1, . . . ,30: ACCHI[i] = ACCUM AND ACCVAL[i+33] |
| | ACCHI[31] = SIGNED AND ACCUM AND ACCVAL[63] |
| | AH1[1:0] = ACCHI[1:0] |
| | AH2[1:0] = ACCHI[3:2] |
| | AH4[1:0] = ACCHI[5:4] |
| | AH5[1:0] = ACCHI[7:6] |
| Cycle 2: | AH1[1:0] = ACCHI[9:8] |
| | AH2[1:0] = ACCHI[11:10] |
| | AH4[1:0] = ACCHI[13:12] |
| | AH5[1:0] = ACCHI[15:14] |
| Cycle 3: | AH1[1:0] = ACCHI[17:16] |
| | AH2[1:0] = ACCHI[19:18] |
| | AH4[1:0] = ACCHI[21:20] |
| | AH5[1:0] = ACCHI[23:22] |
| Cycle 4: | AH1[1:0] = ACCHI[25:24] |
| | AH2[1:0] = ACCHI[27:26] |
| | AH4[1:0] = ACCHI[29:28] |
| | AH5[1:0] = ACCHI[31:30] |
| Cycle 5: | No change |

Carry and save low latches

| | |
|---|---|
| Cycle 1: | SL[7:0] = (SL5[1:0],SL4[1:0],SL2[1:0],SL1[1:0]) |
| | CL[7:0] = (CL5[1:0],CL4[1:0],CL2[1:0],CL1[1:0]) |
| Cycle 2: | SL[15:8] = (SL5[1:0],SL4[1:0],SL2[1:0],SL2[1:0]) |
| | CL[15:8] = (CL5[1:0],CL4[1:0],CL2[1:0],CL1[1:0]) |
| Cycle 3: | SL[23:16] = (SL5[1:0],SL4[1:0],SL2[1:0],SL1[1:0]) |
| | CL[23:16] = (CL5[1:0],CL4[1:0],CL2[1:0],CL1[1:0]) |
| Cycle 4: | SL[31:24] = (SL5[1:0],SL4[1:0],SL2[1:0],SL1[1:0]) |
| | CL[31:24] = (CL5[1:0],CL4[1:0],CL2[1:0],CL1[1:0]) |
| Cycle 5: | No change |

Multiplexer B

| | |
|---|---|
| Cycles 1–4: | SF[31:0] = SL[31:0] |
| | CF[31:0] = CL[31:0] |
| Cycle 5: | SF[31:0] = S6[31:0] |
| | CF[31:0] = C6[31:0] |

Multiplexer C

| | |
|---|---|
| Cycles 1–4: | CIN = R[0] |
| Cycle 5: | CIN = NEWC |

Carry Latch

| | |
|---|---|
| Cycles 1–3: | No change |
| Cycle 4: | NEWC = COUT |
| Cycle 5: | No change |

Final adder

On all cycles: (COUT, SUM[31:0]) = 33-bit sum of SF[31:0], CF[31:0] and CIN

Result latches

| | |
|---|---|
| Cycles 1–3: | No change |
| Cycle 4: | RESULT[31:0] = SUM[31:0] |
| Cycle 5: | RESULT[63:32] = SUM[31:0] |

FIGS. 6A and 6B together illustrate a multiply-accumulate circuit For multiplying an N-bit multiplicand (MCAND []) and an N-bit multiplier (MPLIER[]) and then adding a 2N-bit accumulate value (ACCVAL[]), in this example N=32. The N-bit multiplier is latched within multiplier latches 2 and the M-bit multiplicand is latched within multiplicand latches 4. The lower portion of the 2N-bit accumulate value is Fed to the carry-save initializer 6 and the upper portion of the 2N-bit accumulate value is fed to accumulate value high latches 8. The carry-save initializer 6 receives the N-bit multiplicand (D[]) and produces either a bitwise inversion of this or zero, depending on whether the value of the bottommost bit of the multiplier latches 2 is one or zero respectively. The result is fed to a multiplexer A 10 to serve as one of the carry value or the save value. The other of the carry value or save value comprises the lowermost bits of the accumulate value.

The N-bit multiplier is also fed to a series of Booth encoders 12 which produce modified Booth summands that are fed to respective ones of the subsequent multiplier rows.

As shown in FIG. 6B, a sequence of multiplier rows 14, 16, 18, 20 are provided that each implement the multiplier algorithm previously discussed. This multiplier algorithm incorporates two bits of the accumulate value on each iteration. Input to each multiplier row 14, 16, 18, 20 on each cycle are a Booth digit (B1[], B2[], B4[], B5[]), bits from the accumulate value stored within the accumulate value high latches 8, bits of the N-bit multiplicand from the multiplicand latches 4 and the save value and carry value from the previous multiplier row either directly or indirectly.

Output from each multiplier row are the lowermost bits (SL,CL) that are no longer changing on subsequent iterations and the current save value and carry value. These lowermost bits are accumulated in the carry and save low latches 24. The save value and carry value (S6[], C6[]) is fed back to the first multiplier row 14 via carry-save latches A 22 and multiplexer A 10. When the final multiplication iteration has been completed, the carry value and save value from the last multiplier row 20 and carry and save low latches 24 are respectively fed to a final adder 26 where they are summed over two cycles (the values from the carry and save low latches 24 being fed to the final adder 26 on the first cycle and the values from the final multiplier row 20 on the second cycle) with the result being stored in result latches 28. A multiplexes C 30 serves to feed in the carry bit R[0] left over from the 1's complement initialization during the first addition cycle of the final adder 26 and any carry bit as necessary between the first and second cycles of the final adder 26.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:

(i) a register bank of N-bit data processing registers; and (ii) a multiplier-accumulator coupled to said register bank for performing multiply-accumulate operations upon operands held in said N-bit data processing registers; wherein (iii) said multiplier-accumulator is responsive to a first class of multiply-accumulate instructions to multiply an N-bit operand held in a first data processing register by an N-bit operand held in a second data processing register and add an N-bit operand held in a third data processing register to yield an N-bit result that is stored in a fourth data processing register, said first, second, third and fourth data processing registers within said register bank being independently specified as fields within said first class of multiply-accumulate instructions; and (iv) said multiplier-accumulator is responsive to a second class of multiply-accumulate instructions to multiply an N-bit operand held in a first data processing register by an N-bit operand held in a second data processing register and add a 2N-bit operand held in a third and a fourth data processing registers to yield a 2N-bit result that is stored in said third and said fourth data processing registers, said first, second, third and fourth data processing registers within said register bank being independently specified as fields within said second class of multiply-accumulate instructions.

2. Apparatus as claimed in claim 1, wherein said multiplier-accumulator performs multiplication and addition as a single combined operation.

3. Apparatus as claimed in claim 1, wherein said multiplier-accumulator is responsive to a first class of multiply instructions to multiply an N-bit operand held in a first data processing register by an N-bit operand held in a second data processing register to yield an N-bit result that is stored in a third data processing register, said first, second and third data processing registers being independently specified as fields within said first class of multiply instructions; and said multiplier-accumulator is responsive to a second class of multiply instructions to multiply an N-bit operand held in a first data processing register by an N-bit operand held in a second data processing register to yield an 2N-bit result that is stored in a third and a fourth data processing register, said first, second, third and fourth data processing registers being independently specified as fields within said second class of multiply instructions.

4. Apparatus as claimed in claim 1, wherein said fields specifying said data processing registers occupy no more than half of the instruction bits within said first class of multiply-accumulate instructions and instructions within said second class of multiply-accumulate instructions.

5. Apparatus as claimed in claim 1, wherein said bank of data processing registers comprises no more than sixteen data processing registers.

6. Apparatus as claimed in claim 1, wherein said apparatus comprises an integrated circuit microprocessor.

7. Apparatus as claimed in claim 1, wherein instructions within said first class of multiply-accumulate instructions and instructions within said second class of multiply-accumulate instructions include a field comprising conditional execution codes and comprising means responsive to said conditional execution codes for controlling whether an instruction should be skipped without execution.

8. Apparatus as claimed in claim 1, wherein said multiplier-accumulator is a dedicated hardware multiplier-accumulator.

9. Apparatus as claimed in claim 1, wherein N is equal to thirty two.

10. A method of processing data using an apparatus having a register bank of N-bit data processing registers and a multiplier-accumulator coupled to said register bank for performing multiply-accumulate operations upon operands held in said N-bit data processing registers, said method comprising the steps of:

(i) in response to a first class of multiply-accumulate instructions, multiplying an N-bit operand held in a first data processing register by an N-bit operand held in a second data processing register and adding an N-bit operand held in a third data processing register to yield an N-bit result that is stored in a fourth data processing register, said first, second third and fourth data processing registers within said register bank being independently specified as fields within said first class of multiply-accumulate instructions; and (ii) in response to a second class of multiply-accumulate instructions multiplying an N-bit operand held in a first data processing register by an N-bit operand held in a second data processing register and adding a 2N-bit operand held in a third and a fourth data processing registers to yield a 2N-bit result that is stored in said third and said fourth data processing registers, said first, second, third and fourth data processing registers within said register bank being independently specified as fields within said second class of multiply-accumulate instructions.

* * * * *